June 2, 1931.  J. McK. GUNN  1,808,653

BASKET

Filed April 28, 1930

INVENTOR.
J. M. Gunn
BY J. T. Newton
ATTORNEYS.

Patented June 2, 1931

1,808,653

UNITED STATES PATENT OFFICE

JOHN McKENZIE GUNN, OF CUTHBERT, GEORGIA

BASKET

Application filed April 28, 1930. Serial No. 448,043.

This invention relates to fruit or vegetable baskets or containers, the principal object being to provide a basket or container that will, by its construction features, automatically ventilate the fruits or vegetables contained therein.

Another object of the invention is to accomplish automatic ventilation by the most economic construction.

Fruit and vegetable shipping baskets must be constructed sufficiently strong to allow stacking of the baskets for transportation or storage purposes. At the same time, the baskets must be economically produced and when full of fruits or vegetables, especially if they are soft, I have found there is insufficient ventilation. If the basket is made of open work from bottom to top on its sides, while ventilation may be sufficient on the outer surface of the enclosed fruits or vegetables, there is nothing to cause circulation of air through the contents of the basket. My invention is designed to overcome this difficulty by providing ventilating slots around the sides of the basket preferably extending from the bottom thereof upwardly to approximately a middle zone of the basket, the upper half of the basket side wall being, in effect, an imperforate wall causing the basket, when filled with fruit or vegetables, to act somewhat on the principle of a chimney and fire place. That is to say, should the fruit or vegetables generate heat as they begin to spoil, heat or sweat the slots in the lower part of the sides of the basket will allow free access of air to the contents and the upper portion of the side wall of the basket being an unbroken solid wall would act as a chimney to create a draft through the slots in the lower portion of the basket, thence upwardly through the chimney like portion and thus tend to automatically ventilate the contents of the basket.

With these and other objects in view which will appear as the description proceeds, I will now describe my invention in connection with the accompanying drawings in which.

Figure 1:
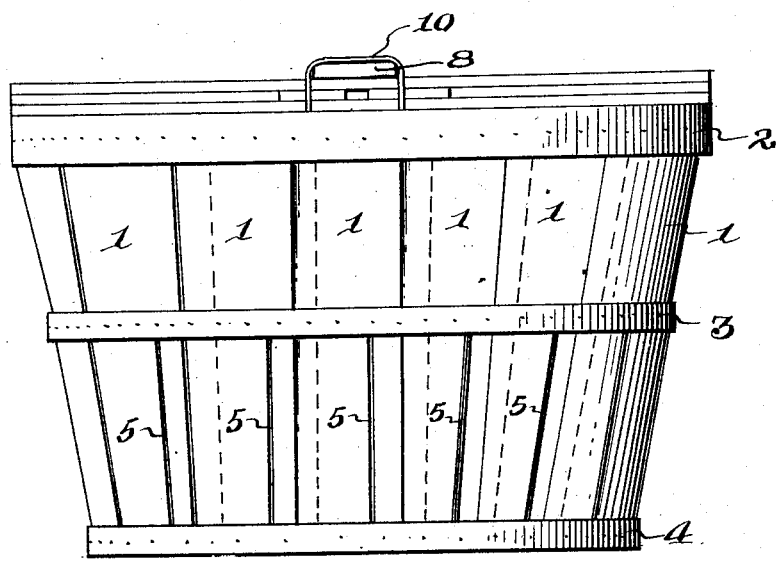
Figure 1 is an elevation of the basket.
Figure 2:
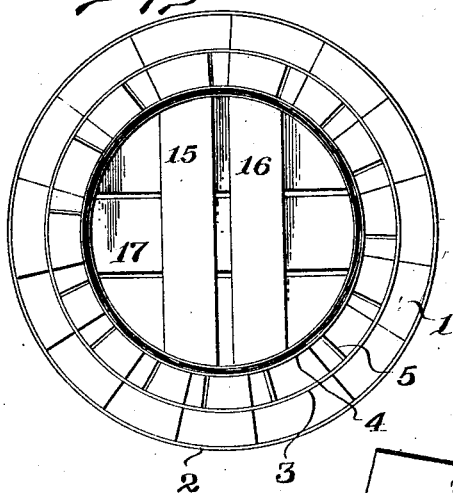
Figure 2 is a view of the bottom of the basket.
Figure 3:
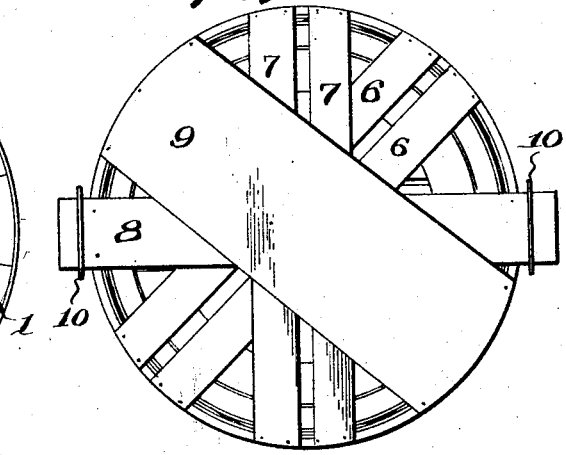
Figure 4:
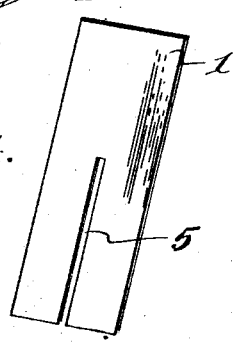

Figure 3 a view of the top of the basket and Figure 4 one of the staves of which the side of the basket is made up.

The general shape and outline of my basket is similar to that shown in the patent to Hogue, No. 1,608,065, November 23, 1926. The side staves are held preferably by three hoops 2, 3, 4. The side staves overlap slightly at the top and somewhat more at the bottom of the basket and, as shown in said Hogue patent, the upper portion of the sides of my basket is a continuous almost airtight wall.

Before the staves are arranged to make the sides of the basket, I pile them on top of each other and saw or cut out a slot 5 so that when the staves 1—1 are arranged to constitute the sides of the basket the upper portion of the basket, say from about the hoop 3 to the top of the basket, will constitute a practically imperforate wall whereas the lower portion of the basket from approximately the hoop 3 to the bottom of the basket will have therein the slots 5—5.

I have found by actual experience that by closing the upper sides of the basket and having the slots 5—5 in the lower portion of the basket, that the upper portion acts somewhat as a chimney to draw the air through the slots 5 when the material in the basket begins to heat or if the material in the basket is hot when placed therein. This heating of the air in the upper portion of the basket causes a draft through the lower portion of the basket and the top portion which, as shown in Figure 3, is open, the basket cover being composed of cover slats 6—6, 7—7, 8 and 9, the slats 6, 7 and 9 being stapled to the cover hoop of the basket and the slat 8 being somewhat longer than the others to pass through the handles 10—10.

The bottom of the basket is preferably covered by slats 15, 16, 17.

It will be noticed that when the basket sits flat on its bottom little ventilation can take place through the bottom of the basket. The ventilation in my basket is through the slots 5 thence upwardly through the interior surrounded by the solid side wall 1—1 etc. and out at the top which is always more or less open.

After piling the staves one on top of each other and sawing or cutting out the slot 5, my baskets are made by machinery in much the same manner as is described in said patent to Hogue.

Having now described my invention, its manner of use and its operation, what I claim is:

1. A container or basket of the class described, comprising a side wall formed of staves and a top, the staves contacting to form an imperforate, surrounding wall in the upper side portion of the basket or container, said wall having in its lower portion ventilating slots extending up from near the bottom of the basket not farther than approximately the middle of the basket, the top of the basket or container being also constructed of open work to allow the air to pass through the slots in the lower portion of the sides of the basket and be drawn up by the draft created by said imperforated upper portion, through the contents and out through the open work at its top.

2. A basket or container comprising an open work top, a conical side wall formed of staves overlapping each other from bottom to top, each stave having therein an open slot extending from its bottom portion upwardly to approximately its middle portion, the upper portion of said side wall of the basket or container being imperforate to cause a draft of air through said slots and open top-work of said basket or container.

3. A basket or container comprising an open top-work, a side wall made up of upstanding staves contacting each other throughout their length to make an imperforate wall at their upper portions, said staves having ventilating perforations through their lower portions extending from the bottom of the basket to approximately its median height line whereby circulation of air is induced through said ventilating perforations in the lower portion of said side wall and out through the open top-work.

In testimony whereof I affix my signature.
JOHN McKENZIE GUNN.